US008166339B2

(12) United States Patent  (10) Patent No.: US 8,166,339 B2
Kyusojin                    (45) Date of Patent:   Apr. 24, 2012

(54) INFORMATION PROCESSING APPARATUS, INFORMATION PROCESSING METHOD, AND COMPUTER PROGRAM

(75) Inventor: Hiroshi Kyusojin, Tokyo (JP)

(73) Assignee: Sony Corporation, Tokyo (JP)

( * ) Notice: Subject to any disclaimer, the term of this patent is extended or adjusted under 35 U.S.C. 154(b) by 322 days.

(21) Appl. No.: 12/401,684

(22) Filed: Mar. 11, 2009

(65) Prior Publication Data

US 2009/0265500 A1    Oct. 22, 2009

(30) Foreign Application Priority Data

Apr. 21, 2008  (JP) ................................ 2008-110542

(51) Int. Cl.
*G06F 11/07* (2006.01)

(52) U.S. Cl. .......... 714/6.3; 714/4.11; 714/4.2; 714/6.2; 714/42; 710/305; 710/309; 710/316; 711/147; 711/153; 711/170

(58) Field of Classification Search .................... 714/42, 714/4.2, 4.11, 6.3
See application file for complete search history.

(56) References Cited

U.S. PATENT DOCUMENTS

| | | | |
|---|---|---|---|
| 2002/0016891 A1* | 2/2002 | Noel et al. ............. | 711/153 |
| 2002/0016892 A1* | 2/2002 | Zalewski et al. ........ | 711/153 |
| 2002/0032850 A1* | 3/2002 | Kauffman ............... | 712/31 |
| 2003/0140271 A1* | 7/2003 | Wynn et al. ............ | 714/8 |
| 2003/0177425 A1* | 9/2003 | Okin .................... | 714/724 |
| 2005/0060460 A1* | 3/2005 | Karamatas et al. ...... | 710/260 |
| 2005/0257222 A1* | 11/2005 | Davis et al. .......... | 718/104 |
| 2006/0080514 A1* | 4/2006 | Newport ............... | 711/153 |
| 2006/0085598 A1* | 4/2006 | Nemoto et al. ........ | 711/118 |
| 2006/0143350 A1* | 6/2006 | Miloushev et al. ..... | 710/242 |
| 2007/0061612 A1* | 3/2007 | Henderson et al. ..... | 714/5 |
| 2007/0073993 A1* | 3/2007 | Allen et al. ......... | 711/170 |
| 2007/0204113 A1* | 8/2007 | Landry ................ | 711/154 |
| 2007/0233967 A1* | 10/2007 | Rangarajan et al. ... | 711/147 |
| 2008/0163050 A1* | 7/2008 | Yamaji et al. ........ | 715/700 |
| 2008/0184275 A1* | 7/2008 | Hughes et al. ........ | 719/321 |
| 2008/0195719 A1* | 8/2008 | Wu et al. ............ | 709/213 |
| 2009/0006798 A1* | 1/2009 | Bartley et al. ....... | 711/167 |
| 2009/0037585 A1* | 2/2009 | Miloushev et al. .... | 709/226 |

FOREIGN PATENT DOCUMENTS

| | | |
|---|---|---|
| JP | 5-290001 | 11/1993 |
| JP | 10-21203 | 1/1998 |
| JP | 3123425 | 10/2000 |
| JP | 2006-39822 | 2/2006 |
| JP | 3832833 | 7/2006 |
| JP | 3924206 | 3/2007 |

* cited by examiner

*Primary Examiner* — Scott Baderman
*Assistant Examiner* — Chae Ko
(74) *Attorney, Agent, or Firm* — Finnegan, Henderson, Farabow, Garrett & Dunner, L.L.P.

(57) ABSTRACT

An information processing apparatus including a plurality of nodes, each node connecting at least a memory and a processor to a system bus; an interconnection bus that interconnects the nodes; a device that is connected to a system bus on any of the plurality of nodes and performs data processing; and a memory selecting unit that selects a memory connected to the system bus to which the device is connected as a memory to be accessed by the device.

10 Claims, 12 Drawing Sheets

INFORMATION PROCESSING APPARATUS, INFORMATION PROCESSING METHOD, AND COMPUTER PROGRAM

CROSS REFERENCES TO RELATED APPLICATIONS

The present invention contains subject matter related to Japanese Patent Application JP 2008-110542 filed in the Japanese Patent Office on Apr. 21, 2008, the entire contents of which are incorporated herein by reference.

BACKGROUND OF THE INVENTION

1. Field of the Invention

The present invention relates to information processing apparatuses, information processing methods, and computer programs. More particularly, the present invention relates to an information processing apparatus that has a structure in accordance with non-uniform memory access (NUMA), which is the architecture of a shared-memory multiprocessor system, an information processing method, and a computer program.

2. Description of the Related Art

In recent years, there have been an increasing number of multiprocessor information processing apparatuses that have a plurality of processors (central processing units (CPUs)) and realize efficient data processing by performing parallel processing using the processors. In such a multiprocessor system, a plurality of processors access a shared memory. In such a system, NUMA is available as an architecture in which access cost from each processor to the memory is not uniform.

FIG. 1 shows a structure example of an information processing apparatus with a NUMA architecture. As shown in FIG. 1, a plurality of chipsets 11 and 21 are interconnected as nodes to a crossbar switch. An address conversion table 31 for converting an address at the time of accessing, from one node, a memory connected to another node is connected to the crossbar switch.

A CPU-1 12, a memory-1 13, and a device-1 14 are connected to the chipset 11 via a system bus 1 serving as a local bus. A CPU-2 22, a memory-2 23, and a device-2 24 are connected to the chipset 21 via a system bus 2 serving as a local bus.

The memory-1 13 and the memory-2 23 are shared by the CPU-1 12 and the CPU-2 22. In NUMA with such a shared-memory structure, access cost from each CPU to each memory is not uniform.

For example, when a task running on the CPU-1 12 accesses data stored in the memory-2 23, the memory-2 23 is necessary to be accessed via the system bus 1 of the chipset 11, the crossbar switch, and the system bus 2 of the chipset 21. In such a manner, when a CPU where a task is running and a memory where data is stored are not on the same local bus (system bus), the memory access cost increases.

Numerous measures have already been proposed to improve the performance related to memory access cost in a system with a NUMA architecture. For example, Japanese Patent No. 3832833 (International Business Machines Corp. (IBM)) proposes a structure that realizes low delay in coherency communication at the time data is given via a bus other than a local bus in response to a read request from a CPU.

Also, Japanese Patent No. 3924206 (IBM) eliminates unnecessary coherency communication by setting a write through indicator in correspondence with data and determining whether details of a change can be cached.

Furthermore, Japanese Unexamined Patent Application Publication No. 2006-39822 (Canon Inc.) discloses a structure that speculatively repeats task allocation to a multiprocessor and determines an optimal combination of a task and a processor on the basis of the value of a communication cost involved in each CPU.

However, these techniques of the related art are only trying to optimize memory access from a CPU to a memory. As devices involving input/output of a large amount of data have been appearing in recent years, a high load may be placed on a CPU because of a device driver. It is thus necessary to achieve optimization, taking into consideration devices.

For example, with the foregoing techniques of the related art, there is no advantageous effect in an information processing apparatus in which a CPU and a memory are on the same local bus, but a device and a memory to be accessed by the device are not on the same local bus. Specifically, there is no advantageous effect in the structure shown in FIG. 2.

Referring to FIG. 2, as in FIG. 1, the chipsets 11 and 21 are interconnected as nodes to the crossbar switch. The address conversion table 31 for converting an address at the time of accessing, from one node, a memory connected to another node is connected to the crossbar switch.

The CPU-1 12, the memory-1 13, and the device-1 14 are connected to the chipset 11 via the system bus 1 serving as a local bus. The CPU-2 22, the memory-2 23, and the device-2 24 are connected to the chipset 21 via the system bus 2 serving as a local bus.

A device driver 41 for the device-1 14 connected to the system bus 1 on the chipset 11 side is set up on the CPU-2 22 connected to the system bus 2 on the chipset 21 side.

By activating the device driver 41 included in the CPU-2 22 on the chipset 21 side, the device-1 14 on the chipset 11 side starts operating, and the device-1 14 performs data processing. For example, when the device-1 14 is a network card, the device-1 14 performs communication processing with the outside via a network. Alternatively, when the device-1 14 is a video card, the device-1 14 performs image data processing.

Data 43 to be processed by the device-1 14, such as communication data or video data, is stored in the memory-2 23 on the chipset 21 side by performing direct memory access (DMA) via the crossbar switch. Also, when obtaining data 42 from the memory-2 23, the device-1 14 performs DMA via the crossbar switch.

These techniques of the related art are only trying to optimize memory access from a CPU to a memory. Therefore, as shown in FIG. 2, as in an information processing apparatus in which a device and a memory are not on the same local bus, in a structure where data is transferred among a device, a memory, and a CPU, an advantageous effect is not sufficiently achieved by using the techniques of the related art.

Furthermore, Japanese Patent No. 3123425 (Nippon Electric Co., Ltd. (NEC)) discloses a structure in which load dispersion is performed by allocating an interrupt from a device to a CPU with the lowest load at that point of time (while using a neural network). This technique is designed by paying attention to load on each CPU.

Even with this structure, as shown in FIG. 3, for example, when a memory to be accessed by a device is not on a local bus to which a CPU is connected, memory access from a driver for the device is performed via a crossbar switch, and accordingly, the load on the CPU on which the driver is running is increased.

An information processing apparatus shown in FIG. 3 has a structure similar to structures shown in FIGS. 1 and 2. The chipsets 11 and 21 are interconnected as nodes to the crossbar switch. The address conversion table 31 for converting an address at the time of accessing, from one node, a memory connected to another node is connected to the crossbar switch.

The CPU-1 12, the memory-1 13, and the device-1 14 are connected to the chipset 11 via the system bus 1 serving as a local bus. The CPU-2 22, the memory-2 23, and the device-2 24 are connected to the chipset 21 via the system bus 2 serving as a local bus.

The device driver 41 for the device-1 14 connected to the system bus 1 on the chipset 11 side is set up on the CPU-2 22 connected to the system bus 2 on the chipset 21 side.

By activating the device driver 41 included in the CPU-2 22 on the chipset 21 side, the device-1 14 on the chipset 11 side starts operating, and the device-1 14 performs data processing. For example, when the device-1 14 is a network card, the device-1 14 performs communication processing with the outside via a network. Alternatively, when the device-1 14 is a video card, the device-1 14 performs image data processing.

In this structure example, unlike the structure shown in FIG. 2, the data 43 processed by the device-1 14 is stored as data 44 by performing DMA to the memory-1 13 connected to the system bus 1 which is a local bus connected to the same chipset. Also, when obtaining data from the memory-1 13, the device-1 14 performs DMA.

In this structure, the device-1 14 can access the memory-1 13 without via the crossbar switch, and accordingly, the memory access cost can be reduced. However, even in this structure, the driver 41 on the CPU-2 22 on the chipset 21 side is necessary to access the memory-1 13 via the crossbar switch, and accordingly, the load on the CPU on which the driver is running is increased.

SUMMARY OF THE INVENTION

It is desirable to provide an information processing apparatus with a NUMA architecture, which reduces delay related to access gained by a device and improves the efficiency of using each processor by optimally combining a bus to which the device is connected and a processor on which a device driver for the device is running, an information processing method, and a computer program.

According to an embodiment of the present invention, there is provided an information processing apparatus including the following elements: a plurality of nodes, each node connecting at least a memory and a processor to a system bus; an interconnection bus that interconnects the nodes; a device that is connected to a system bus on any of the plurality of nodes and performs data processing; and a memory selecting unit that selects a memory connected to the system bus to which the device is connected as a memory to be accessed by the device.

Furthermore, the memory selecting unit may select, if reservation of the memory connected to the system bus to which the device is connected has failed, a memory other than the memory connected to the system bus to which the device is connected as the memory to be accessed by the device.

Furthermore, the memory selecting unit may terminate, if reservation of the memory connected to the system bus to which the device is connected has failed, processing performed by the device.

Furthermore, the memory selecting unit may repeat, if reservation of the memory connected to the system bus to which the device is connected has failed, reservation of the memory connected to the system bus to which the device is connected.

Furthermore, the information processing apparatus may further include a processor selecting unit that selects a processor connected to the system bus to which the device is connected as a processor on which a device driver corresponding to the device is set.

Furthermore, the device selecting unit may determine the system bus to which the device is connected and select the processor connected to the system bus as a processor on which an application using the device is activated.

The device driver may be split into a main processing performing portion that performs main data processing and an interrupt processing performing portion that performs interrupt processing. A first processor that is one of a plurality of processors set to the plurality of nodes may be the main processing performing processor, and a second processor that is different from the first processor may be the interrupt processing performing processor.

The interrupt processing performing processor may select a processor using any one of the following selecting schemes including the following: selecting a processor connected to the system bus to which the device is connected; selecting a processor with the lowest load at a point of time at which the processor is to be selected; and selecting a processor using the round-robin scheme.

The device may be a device that performs communication processing. The main processing unit may be a processing unit that performs data sending completion processing, data reception completion processing, and error processing.

According to an embodiment of the present invention, there is provided an information processing method performed by an information processing apparatus. The information processing apparatus includes a plurality of nodes, each node connecting at least a memory and a processor to a system bus, an interconnection bus that interconnects the nodes, and a device that is connected to a system bus on any of the plurality of nodes and performs data processing. The method includes the step of selecting, with a memory selecting unit, a memory connected to the system bus to which the device is connected as a memory to be accessed by the device.

According to an embodiment of the present invention, there is provided a computer program for causing an information processing apparatus to perform information processing. The information processing apparatus includes a plurality of nodes, each node connecting at least a memory and a processor to a system bus, an interconnection bus that interconnects the nodes, and a device that is connected to a system bus on any of the plurality of nodes and performs data processing. The computer program includes the step of causing a memory selecting unit to select a memory connected to the system bus to which the device is connected as a memory to be accessed by the device.

The program according to the embodiment of the present invention is a computer program that can be provided by a storage medium or a communication medium that provides the program in a computer-readable format to a general computer system that can execute various program codes. By providing such a program in a computer-readable format, processing in accordance with the program can be realized on the computer system.

Further objects, features, and advantages of the embodiments of the present invention will become apparent from detailed description based on the later-described embodiments of the present invention and the appended drawings. The term "system" in this specification is a logical set of a plurality of apparatuses and is not limited to the structure in which these apparatuses are housed in a single housing.

According to the embodiments of the present invention, in an information processing apparatus with a structure in accordance with NUMA which is the architecture of a shared-memory multiprocessor system, a memory on a system bus to which a device is connected is selected as a memory to be accessed by the device. Furthermore, a processor on the bus to which the device is connected is set as a processor on which a device driver for the device is set. With this structure, the device, the processor, and the memory to be accessed by the device and the processor are set on the same system bus. Accordingly, at the time of using the device, the memory can be accessed via one system bus, thereby reducing the memory access cost.

DESCRIPTION OF THE PREFERRED
EMBODIMENTS

Hereinafter, an information processing apparatus, an information processing method, and a computer program according to an embodiment of the present invention will be described.

An information processing apparatus according to an embodiment of the present invention is an information processing apparatus with a NUMA architecture, which is an architecture in which a plurality of processors access a shared memory and the access cost from each processor to the memory is not uniform.

Figure 1:
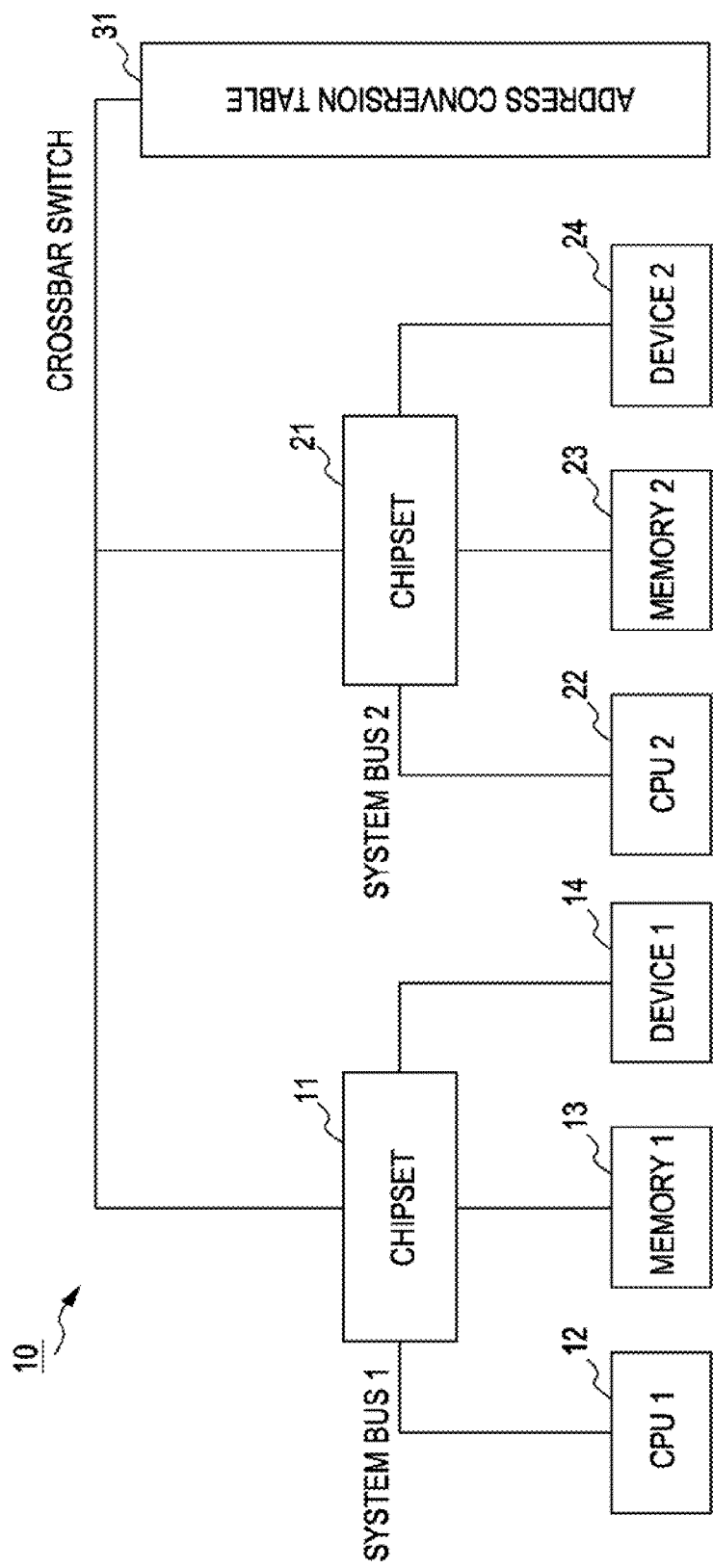
FIG. 1 shows a structure example of an information processing apparatus with a NUMA architecture.
Figure 2:
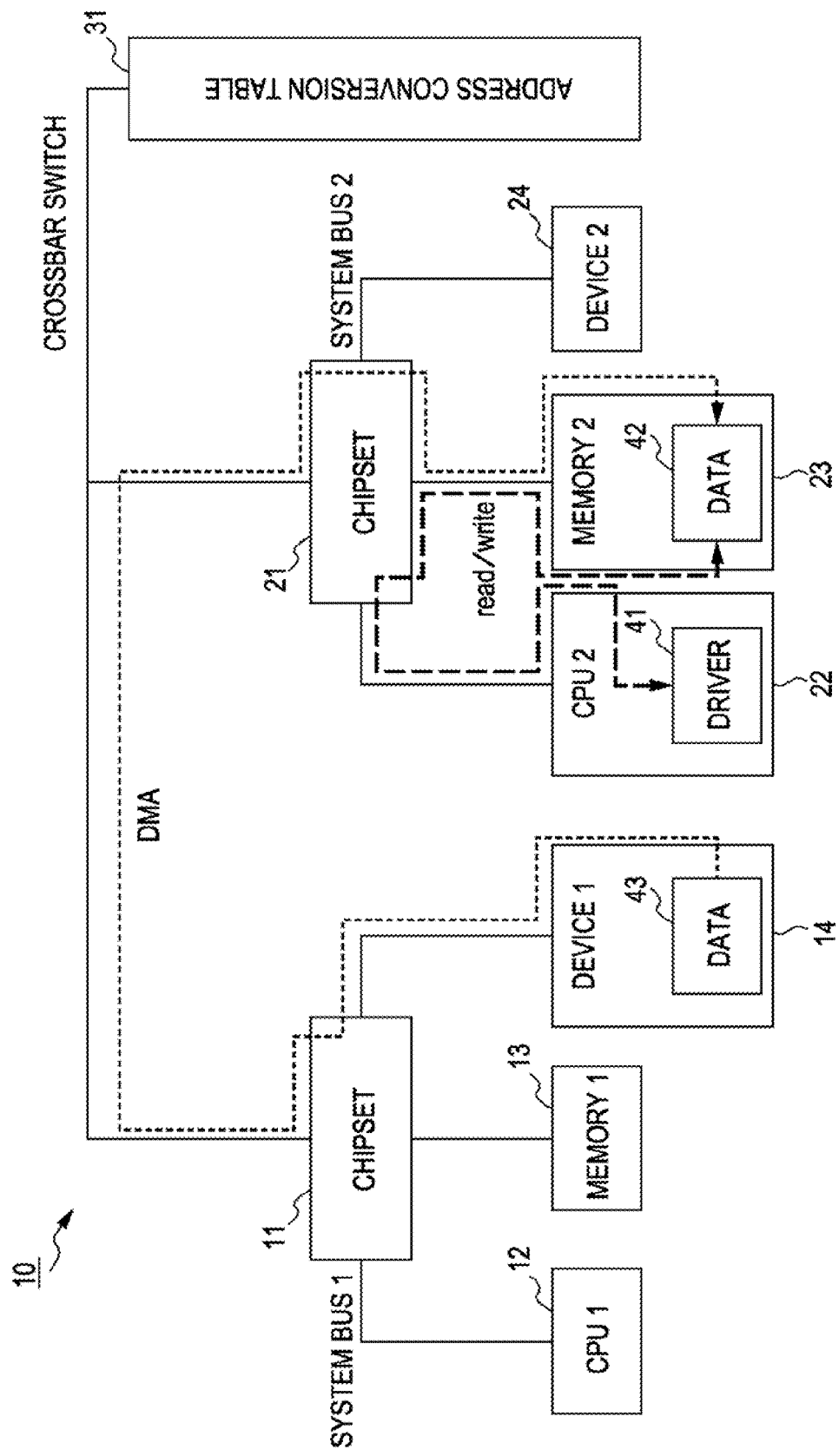
FIG. 2 is a diagram illustrating a structure of and a memory access process performed by an information processing apparatus in which a device and a memory to be accessed by the device are not on the same local bus.
Figure 3:
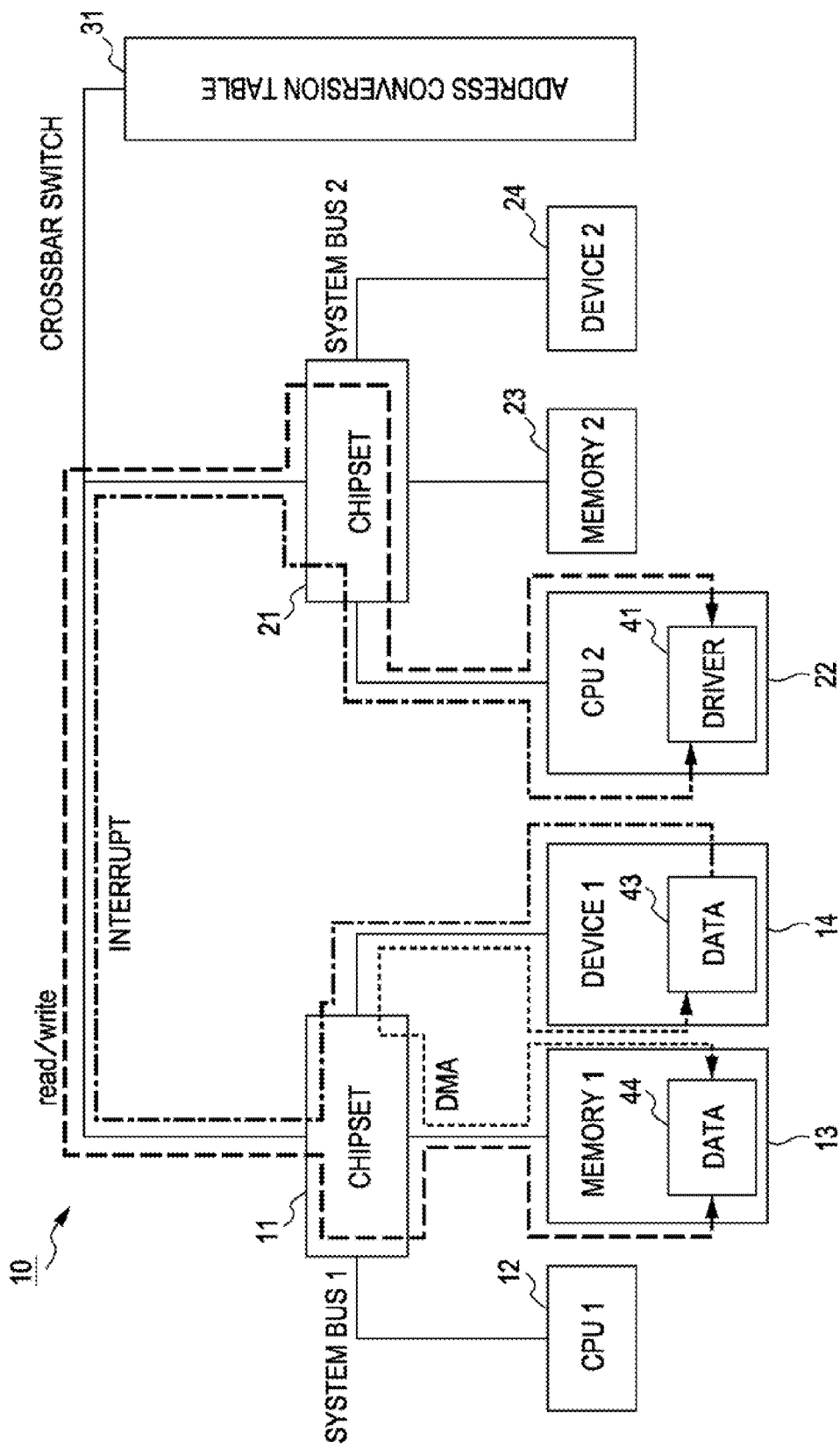
FIG. 3 is a diagram illustrating a structure of and a memory access process performed by an information processing apparatus in which a memory to be accessed by a device is not on a local bus connected to a CPU.
Figure 4:
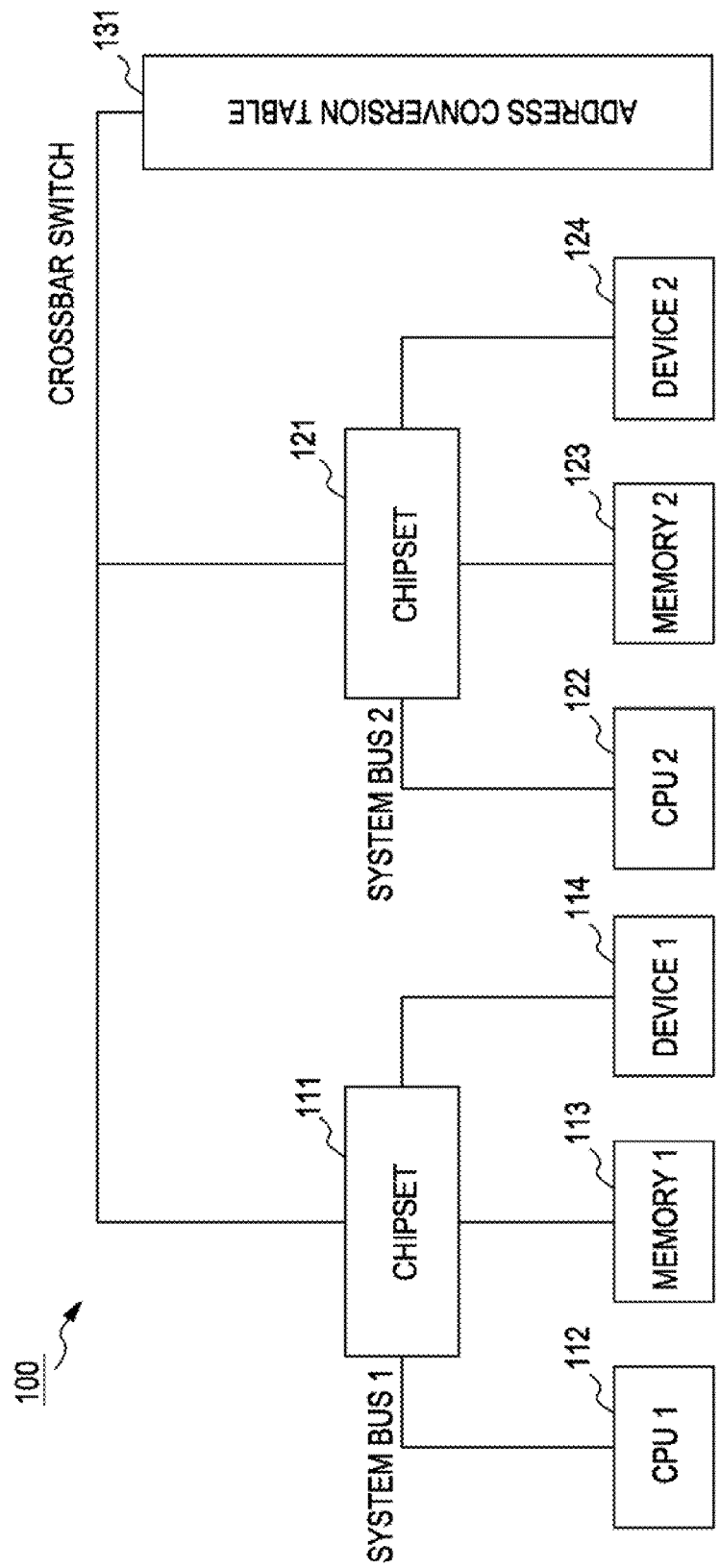
FIG. 4 shows a structure example of an information processing apparatus with a NUMA architecture, which is a structure example of an information processing apparatus according to an embodiment of the present invention.

FIG. 4 shows a structure example of an information processing apparatus with a NUMA architecture, which is a structure example of an information processing apparatus according to an embodiment of the present invention. As shown in FIG. 4, a plurality of chipsets 111 and 121 are interconnected as nodes to a crossbar switch. The crossbar switch functions as an interconnection bus that interconnects a plurality of nodes. An address conversion table 131 for converting an address at the time of accessing, from one node, a memory connected to another node is connected to the crossbar switch.

A CPU-1 112, a memory-1 113, and a device-1 114 are connected to the chipset 111 via a system bus 1 serving as a local bus. A CPU-2 122, a memory-2 123, and a device-2 124 are connected to the chipset 121 via a system bus 2 serving as a local bus.

In the information processing apparatus shown in FIG. 4, the flow of a process performed at the time of accessing a memory from a CPU and a device is described with reference to the flowchart shown in FIG. 5.

Figure 5:
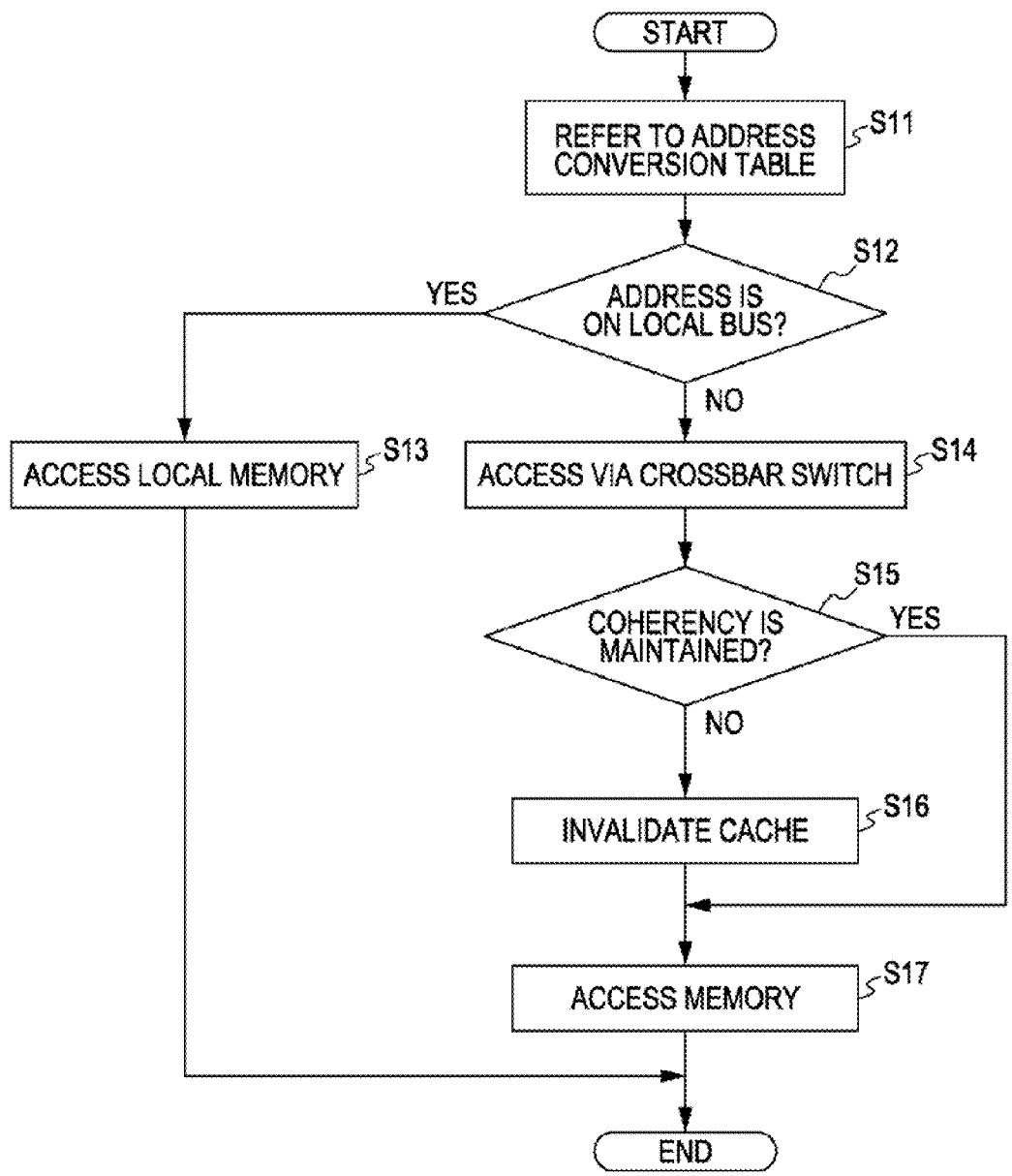
FIG. 5 is a flowchart showing the sequence of a process performed at the time of accessing a memory from a CPU and a device.

The process shown in FIG. 5 is a sequence common to memory access performed by a CPU and to memory access performed by a device using DMA. In step S11, a CPU or device refers to the address conversion table 131. In step S12, it is determined whether a memory to be accessed is on a local bus (system bus) that is the same as a local bus to which the CPU or device is connected.

When it is determined in step S12 that the memory to be accessed is on the same local bus, the flow proceeds to step S13, and normal memory access is performed.

In contrast, when the memory is not on the same local bus (system bus), the flow proceeds to step S14, and the memory is accessed via the crossbar switch. In this case, in step S15, it is determined whether cache and memory coherency can be maintained. That is, it is determined whether coherency can be maintained even when cached data is updated at the time of accessing the memory.

When it is determined in step S15 that coherency can be maintained, the flow proceeds to step S17, and access is gained via the crossbar switch to the memory connected to a local bus (system bus) connected to a different node.

When it is determined in step S15 that no coherency can be maintained, the flow proceeds to step S16. In step S16, the cache is invalidated. In step S17, access is gained via the crossbar switch to the memory connected to a local bus (system bus) connected to a different node.

In the processing in steps S14 to S17, the memory is accessed via the crossbar switch, and accordingly, the processing cost increases. The information processing apparatus according to the embodiment of the present invention avoids such memory access via the crossbar switch.

Figure 6:
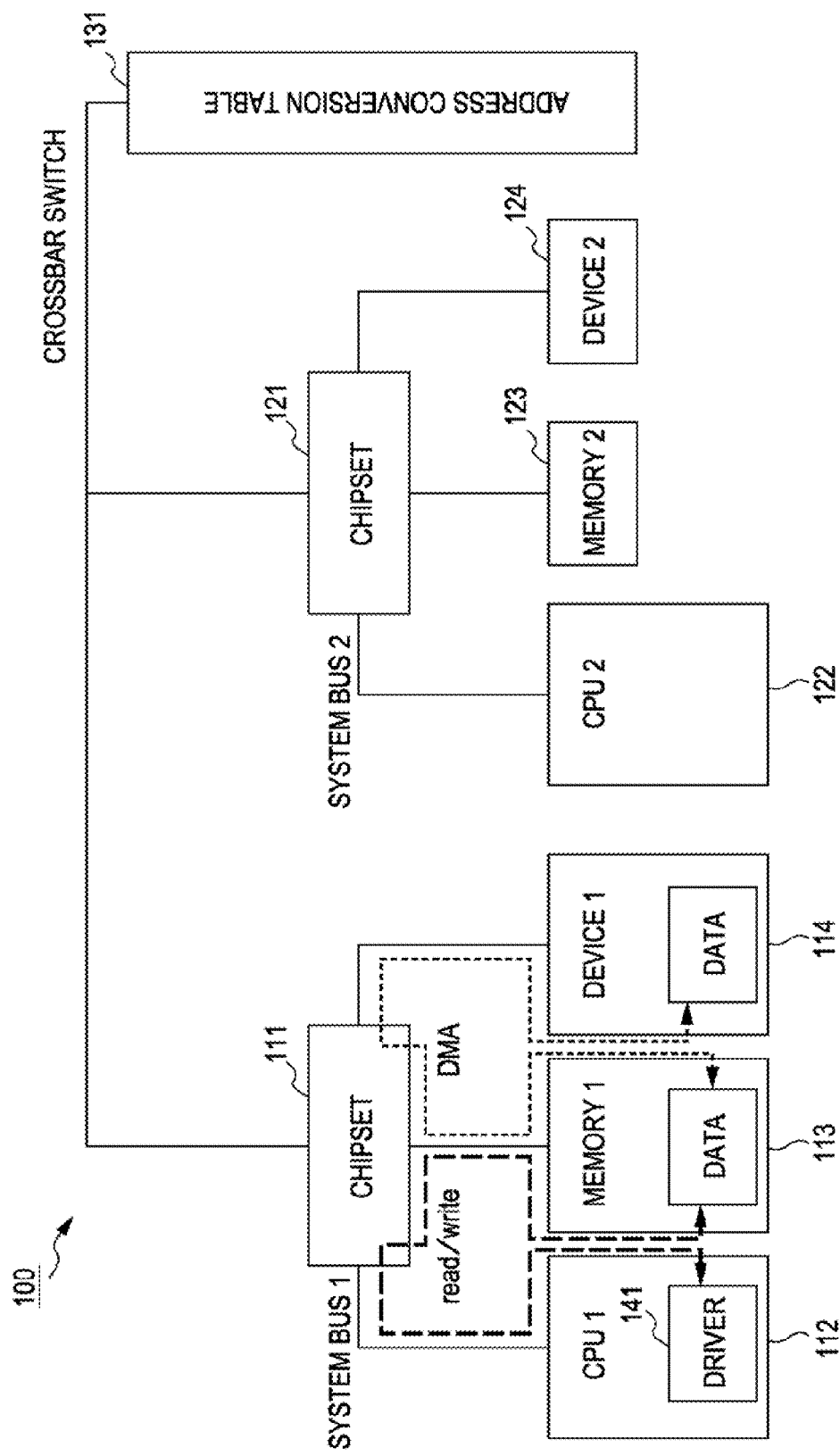
FIG. 6 is a diagram illustrating a data storage structure and a memory access process example of the information processing apparatus according to the embodiment of the present invention.

Referring now to FIG. 6, a data storage structure and a memory access process example of the information processing apparatus according to the embodiment of the present invention will be described. In the information processing apparatus according to the embodiment of the present invention, as shown in FIG. 6, memory access via the crossbar switch is avoided by reserving, on a local bus to which a device is connected, a memory to be accessed by the device.

The information processing apparatus shown in FIG. 6 has a structure similar to that shown in FIG. 4. The chipsets 111 and 121 are interconnected as nodes to the crossbar switch, which is an interconnection bus. The address conversion table 131 for converting an address at the time of accessing, from one node, a memory connected to another node is connected to the crossbar switch.

The CPU-1 112, the memory-1 113, and the device-1 114 are connected to the chipset 111 via the system bus 1 serving as a local bus. The CPU-2 122, the memory-2 123, and the device-2 124 are connected to the chipset 121 via the system bus 2 serving as a local bus.

A device driver 141 for the device-1 114 connected to the system bus 1 on the chipset 111 side is set up on the CPU-1 112 connected to the system bus 1 on the same chipset 111 side.

By activating the device driver 141 included in the CPU-1 112 on the chipset 111 side, the device-1 114 on the chipset 111 side starts operating, and the device-1 114 performs data processing. For example, when the device-1 114 is a network card, the device-1 114 performs communication processing with the outside via a network. Alternatively, when the device-1 114 is a video card, the device-1 114 performs image data processing.

In this structure example, the device-1 114 accesses, using DMA, the memory-1 113 connected to the system bus 1 on the same node or chipset 111 side. Also, the CPU-1 112 on which the device driver 141 corresponding to the device-1 114 has been set accesses the memory-1 113 connected to the system bus 1 on the same node or chipset 111 side.

With such a data access structure, it becomes sufficient for the CPU-1 112 and the device-1 114 to access the memory-1 113 on a local bus (system bus 1) connected to the same node at the time the device-1 114 performs data processing, and accordingly, accessing another node via the crossbar switch is avoided. As a result, the memory is accessed only in step S13 of the flowchart shown in FIG. 5, and the processing via the crossbar switch in steps S14 to S17 is not performed. Therefore, the memory access cost is reduced, and the processing efficiency is increased.

In the information processing apparatus according to the embodiment of the present invention, any of processors included in the information processing apparatus performs the following processing:

selecting, at the time of selecting a memory to be accessed by a device, a memory on a system bus to which the device is connected as the memory to be accessed by the device; and selecting a processor on which a device driver corresponding to a device is to be activated as a processor on a system bus to which the device is connected.

That is, a processor functions as a memory selecting unit and a processor selecting unit.

Specific processing sequences of a memory selecting process and a processor selecting process will be described.

Memory Selecting Process

For example, Linux provides the NUMA application interface (API). By using this API, at the time of reserving a memory by a device driver, on which system bus a memory is to be reserved, can be explicitly specified.

Referring to the flowchart shown in FIG. 7, the sequence of a process performed in the case where this API is used to select a memory to be accessed will be described.

In step S101, a device is initialized by setting register values or the like. In step S102, a bus to which the device is connected is determined. For example, in the case of the device-1 114, it is clear from the structure shown in FIG. 6 that the device-1 114 is connected to the system bus 1. In step S103, a memory to be accessed by the device is reserved on the local bus to which the device is connected by specifying a bus number of the local bus.

When reservation of a memory on the same bus has failed (NO in step S104), in step S105, a memory is reserved without specifying a bus number.

In the flow of the process, if reservation of a memory on the same bus has failed (NO in step S104), the memory to be accessed by the device is reserved without specifying a bus number, thereby reliably reserving a memory.

With this setting, normally, a memory connected to the same bus to which the device is connected is preferentially reserved as the memory to be accessed by the device. Only if reservation of this memory has failed, exceptionally, a memory that is not on the same local bus to which the device is connected is reserved as an access destination.

By reliably performing this memory reserving process in accordance with this processing sequence at the time of activating a device, the structure described with reference to FIG. 6, that is, the structure in which a device and a memory to be accessed by the device are set on the same local bus (system bus), can be configured.

Figure 7:
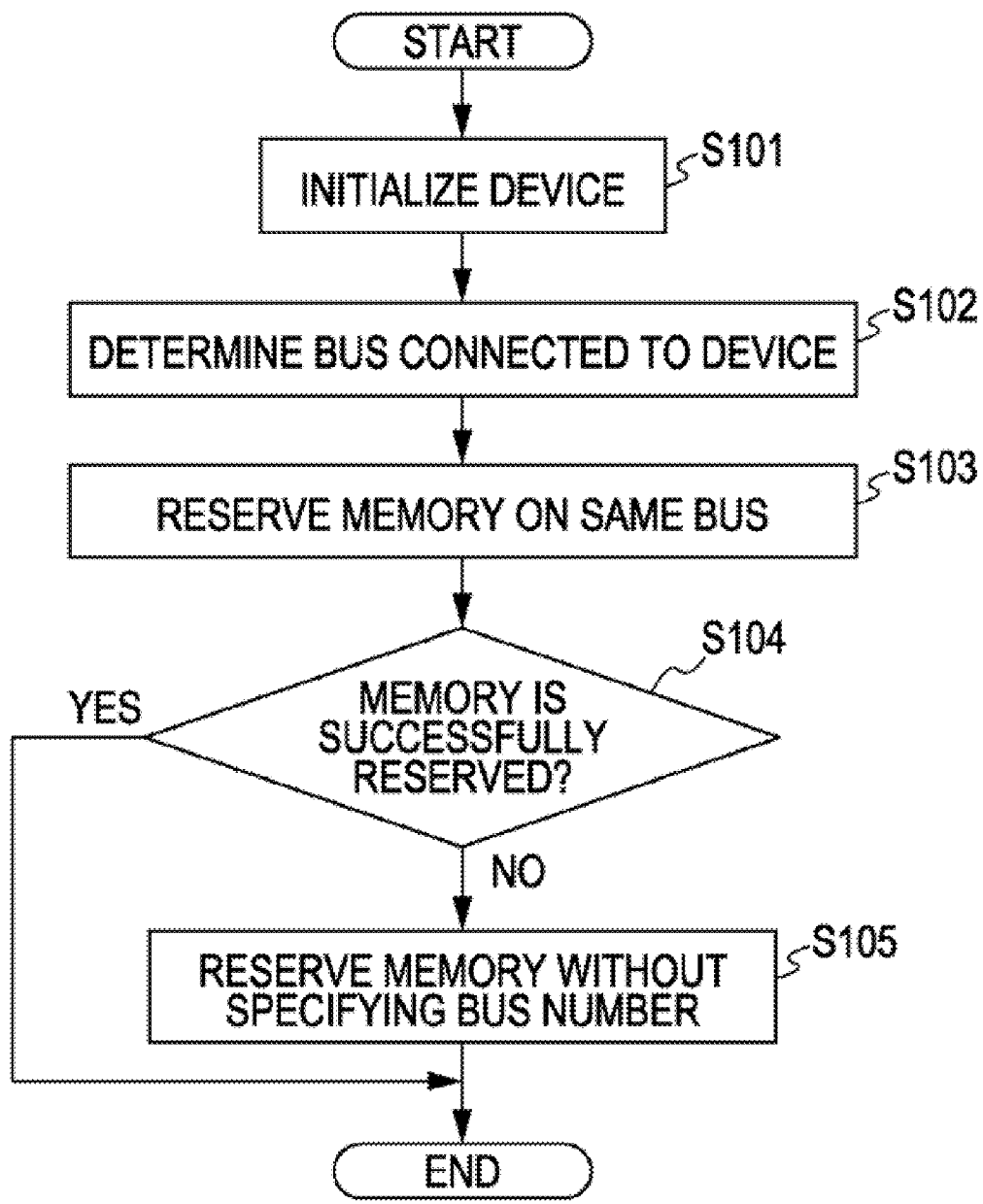
FIG. 7 is a flowchart showing the sequence of a process performed in the case where, at the time of reserving a memory by a device driver, a memory is reserved by specifying a bus.

In the flowchart shown in FIG. 7, when reservation of a memory on the same bus in step S103 has failed (NO in step S104), in step S105, a memory is reserved without specifying a bus number. This sequence gives higher priority to memory reservation than to stopping the processing performed by the device.

That is, in this case, although a memory connected to a node different from that connected to the device may be set as an access destination, the device can still perform processing. Alternatively, when reservation of a memory on the same bus has failed (NO in step S104), it may be set to terminate use of the device.

Alternatively, when reservation of a memory on the same bus has failed (NO in step S104), after a preset standby time, the flow may return to step S103 in which reservation of a memory on the same bus is repeated.

In such a manner, the memory selecting unit in the information processing apparatus according to the embodiment of the present invention performs, at the time of selecting a memory to be accessed by a device, a process of preferentially selecting a memory connected to a system bus to which the device is connected as the memory to be accessed by the device. When reservation of a memory connected to a system bus to which a device is connected has failed, reservation of a memory connected to the system bus may be repeated, or a memory connected to another system bus may be selected as the memory to be accessed. Alternatively, the processing performed by the device may be terminated.

Processor Selecting Process

The process described with reference to FIG. 7 is the sequence of a process of preferentially setting a memory on a local bus to which a device is connected as an access destination of the device. Furthermore, by setting a device driver that controls the device to run on a CPU on the same local bus to which the device is connected, the cost of accessing the memory from the CPU can be reduced.

For example, in Linux implementation, a CPU that performs a process is determined by giving priority to affinity between the CPU and a memory. As has been described above, when a memory used by a device connected to the same node is reserved on the same system bus, a device driver that controls the device is set to run on a CPU on the same system bus to which the device and the memory are connected, without performing special processing.

Also, by using a command such as [numactl], which is one command corresponding to the NUMA architecture, at the time of activating an application, a CPU to be operated can be explicitly specified. The command [numactl] is a command that specifies a bus number and activates an application. With the command [numactl], an application can be activated on a CPU connected to a specific local bus (system bus). That is, using this command, the CPU to be operated can be explicitly specified.

Figure 8:
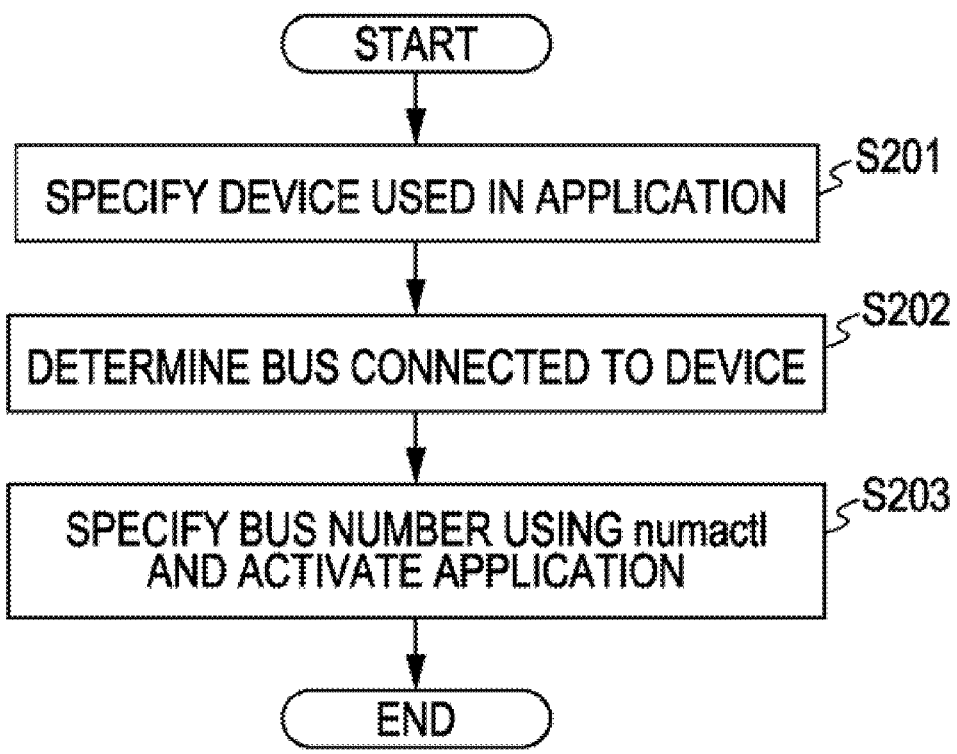
FIG. 8 is a flowchart of a sequence in the case where a CPU connected to a specific local bus (system bus) activates an application.

Referring now to the flowchart shown in FIG. 8, the flow of this process will be described. In step S201, a device to be used in an application is specified. In step S202, a local bus (system bus) to which the device is connected is determined. At last in step S203, the command [numactl] is executed, thus specifying the local bus (system bus) to which the device is connected, explicitly specifying the CPU to be operated, and activating the application in the specified CPU.

With this processing, the memory access structure shown in FIG. 6 is realized in which a device, a memory to be accessed by the device, and a CPU that runs a device driver for the device are set on the same local bus (system bus). As a result, at the time of accessing a memory in processing using a device, a memory connected to a node different from that connected to the device is prevented from being accessed. That is, the memory is accessed only in step S13 of the flowchart shown in FIG. 5, and the processing via the crossbar switch in steps S14 to S17 is not performed. Therefore, the memory access cost is reduced, and the processing efficiency is increased.

In this manner, the processor selecting unit in the information processing apparatus according to the embodiment of the present invention performs a process of selecting a processor connected to a system bus connected to a device as a processor on which a device driver corresponding to the device is set. Specifically, a system bus connected to a device is determined, and a processor connected to the system bus is set as a processor that activates an application using the device.

Other Embodiments

A multiprocessor system includes a plurality of CPUs. An embodiment in which the processing efficiency is improved by using the plurality of CPUs will now be described below.

When the load on each CPU is low and the frequency of the CPU being interrupted by a device is low, the processing efficiency is improved by sending an interrupt notification to a CPU on which a device driver is running, in terms of the locality of data. However, there are cases where the amount of data that can be processed by each CPU is less than the amount of data that can be processed by a device, or interrupts are highly frequently generated and the processing efficiency of each CPU is reduced.

Figure 9:
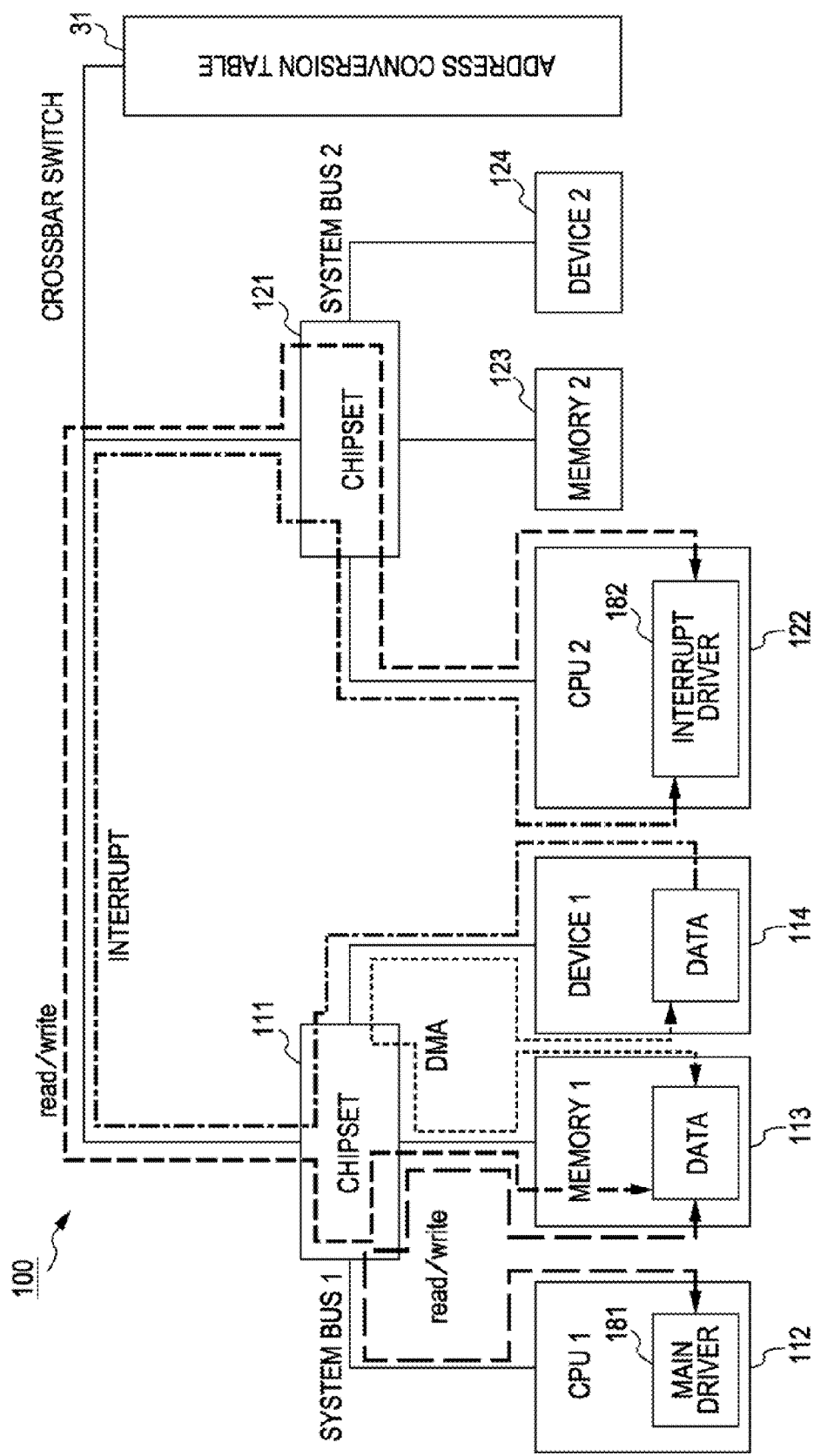
FIG. 9 is a diagram illustrating a structure example in which the processing efficiency is improved by using a plurality of CPUs.

Referring to FIG. 9, a structure example in which the processing efficiency is improved by using a plurality of CPUs will be described. An information processing apparatus shown in FIG. 9 is an information processing apparatus 100 that has a structure similar to structures shown in FIGS. 4 and 6.

The chipsets 111 and 121 serving as nodes are connected to the crossbar switch, which is an interconnection bus. The CPU-1 112, the memory-1 113, and the device-1 114 are connected to the chipset 111 via the system bus 1 serving as a local bus. The CPU-2 122, the memory-2 123, and the device-2 124 are connected to the chipset 121 via the system bus 2 serving as a local bus.

In this structure example, a device driver corresponding to the device-1 114 connected to the system bus 1 on the chipset 111 side is split into a portion that performs interrupt processing and a portion (bottom half) that performs main data processing, and the portions are operated on different processors (CPUs). With this structure, the effects of evacuation/recovery of values in registers and updating of data in caches due to interrupts can be eliminated, and accordingly, the processing efficiency of the device driver is improved.

Specifically, a device driver corresponding to the device-1 114 connected to the system bus 1 on the chipset 111 side, shown in FIG. 9, is split into two portions, and the two portions are operated on the CPU-1 112 and the CPU-2 122, respectively.

The CPU-1 112 connected to the same local bus (system bus 1) to which the device-1 114 is connected is a CPU including a main driver 181 that performs main data processing (bottom half); and The CPU-2 122 connected to a local bus (system bus 2) different from that connected to the device-1 114 is a CPU including an interrupt driver 182 that performs interrupt processing.

As above, by splitting a device driver into a portion that performs interrupt processing and a portion (bottom half) that performs main data processing and running these portions on different CPUs, the effects of evacuation/recovery of values in registers and updating of data in caches due to interrupts can be eliminated, and accordingly, the processing efficiency of the device driver can be improved.

A process of selecting a CPU that processes an interrupt from a device is performed on the basis of, for example, a policy of the operating system (OS). For example, a CPU is selected using any one of the following schemes:
  selecting a CPU on the same local bus;
  selecting a CPU with the lowest load at that point of time; and
  selecting a CPU using the round-robin scheme.

For example, since an interrupt for a CPU on a local bus is fixedly generated in Linux, as has been described above, if a memory on the local bus has been reserved, an interrupt handler in a kernel is modified so that an interrupt for a CPU other than that on the local bus will be generated. By setting an interrupt to be generated for a CPU other than that on the local bus, resultantly, the interrupt hander of the device driver is executed on a CPU other than that on the local bus.

Figure 10:
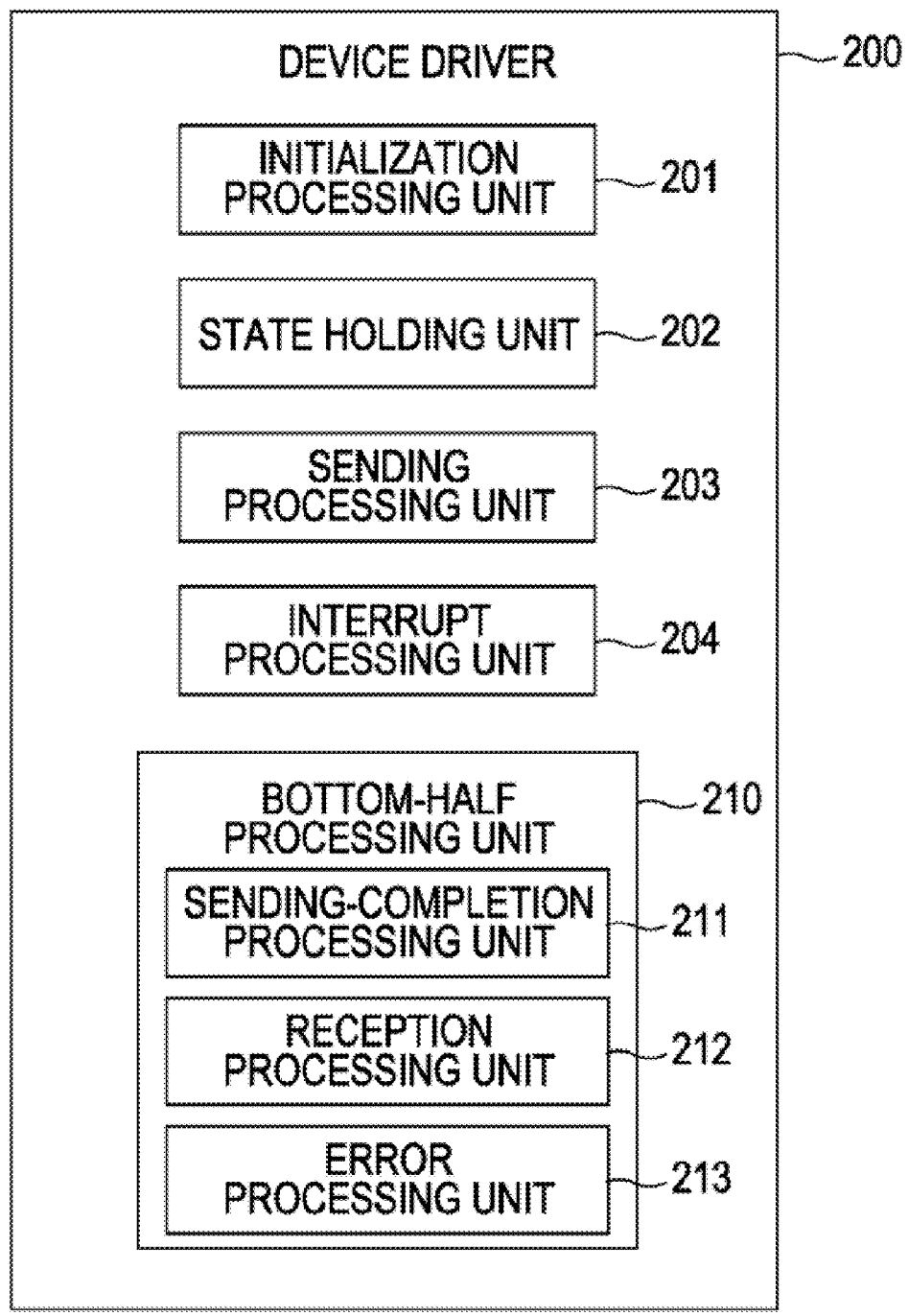
FIG. 10 is a diagram illustrating a structure example of a device driver split into a portion that performs interrupt processing and a portion (bottom half) that performs main data processing.

FIG. 10 shows a structure example of a device driver in this case. That is, FIG. 10 shows a structure example of a device driver in the case where a device is a network card.

As shown in FIG. 10, a device driver 200 includes the following elements: an initialization processing unit 201 that performs initialization at the time the device is recognized by the OS; a state holding unit 202 that stores setting information, such as an Internet Protocol (IP) address and a maximum transmission unit (MTU); a sending processing unit 203 that is called by an upper layer and sends packets; an interrupt processing unit 204 that is called at the time an interrupt from the device is generated; and a bottom-half processing unit 210 that is set in a scheduler at the time of interrupt processing.

Figure 11:
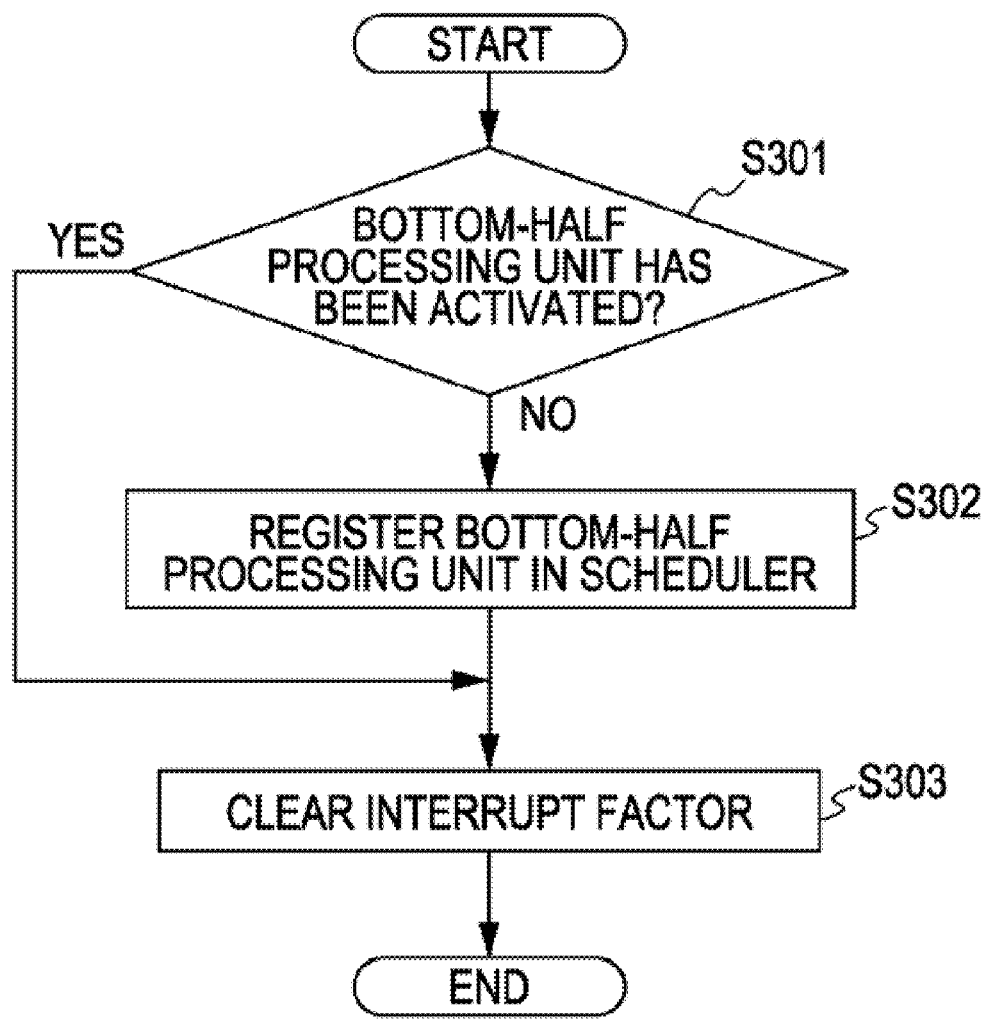
FIG. 11 is a flowchart showing the sequence of a process performed by an interrupt processing unit at the time an interrupt is generated.

The bottom-half processing unit 210 includes a sending-completion processing unit 211, a reception processing unit 212, and an error processing unit 213. Referring to the flowchart shown in FIG. 11, the flow of a process performed by the interrupt processing unit 204 at the time an interrupt is generated will be described.

In step S301, it is determined whether the bottom-half processing unit 210 has already been activated. For example, Linux's bottom half is implemented as [tasklet] and [poll] functions. Whether a bottom half is running can be determined by checking a variable value in the kernel.

When the bottom-half processing unit 210 has been activated, the flow proceeds to step S303. When the bottom-half processing unit 210 has not been activated (NO in step S301), the flow proceeds to step S302. The bottom-half processing unit 210 is registered in a kernel scheduler so that the bottom-half processing unit 210 will be executed at the time the next timer interrupt is generated and the kernel scheduler is activated. Thereafter in step S303, the factor of the interrupt is cleared (by deasserting Intx in the case of peripheral component interconnect (PCI)), and the process is terminated.

Figure 12:
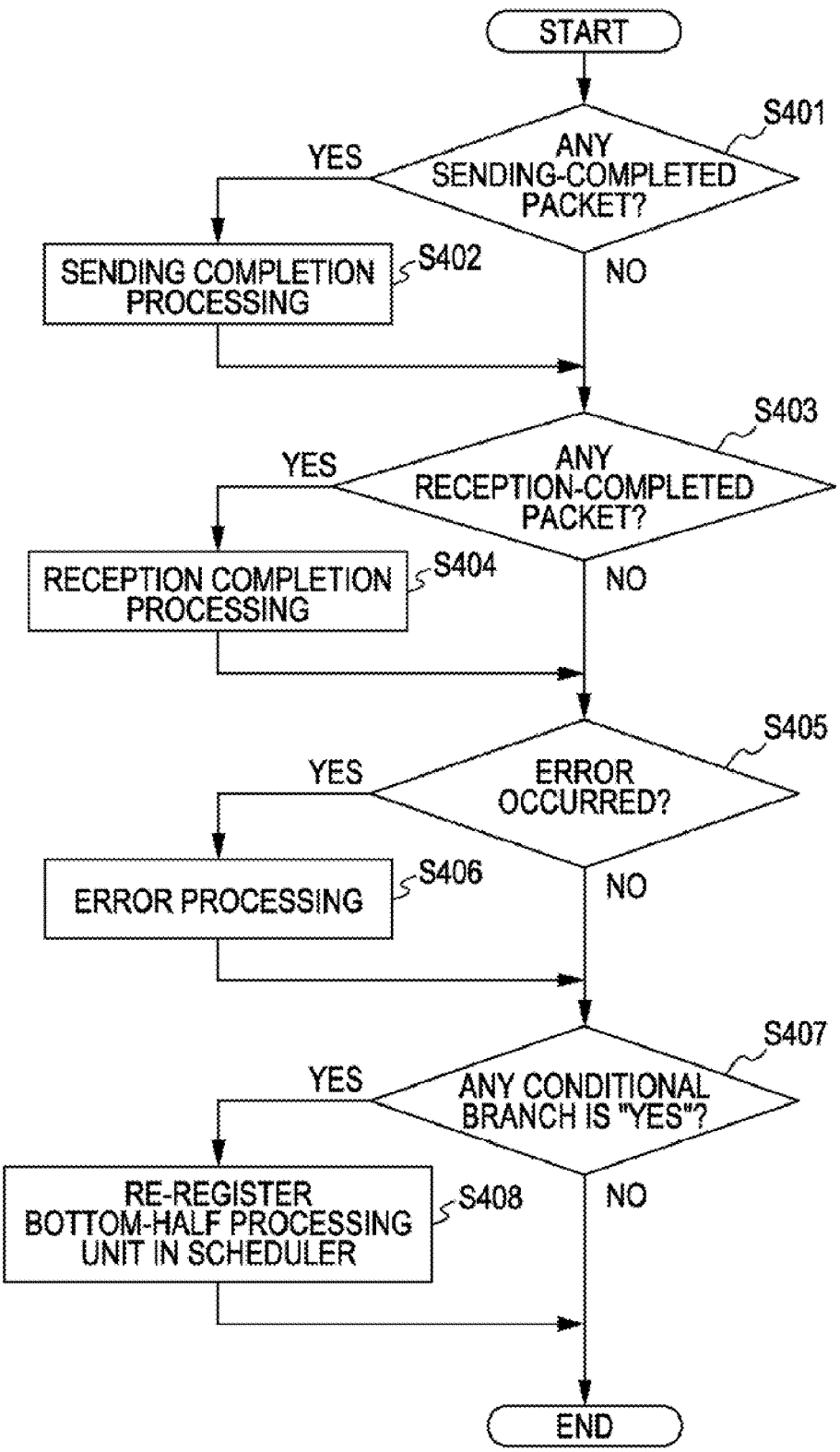
FIG. 12 is a flowchart showing the sequence of a process performed at the time a bottom-half processing unit is scheduled.

Referring now to the flowchart shown in FIG. 12, the flow of a process performed at the time the bottom-half processing unit 210 is scheduled will be described. In step 5401, it is determined whether there is a sending-completed packet. If there is a sending-completed packet, in step S402, sending completion processing such as releasing the memory is performed.

In step S403, it is determined whether there is a received packet. If there is a received packet, in step S404, the received packet is transferred to an upper protocol.

In step S405, whether an error has occurred is determined. If an error has occurred, in step S406, error processing is performed.

In step S407, it is determined whether any of the sending completion processing in step 5402, the reception completion processing in step S404, and the error processing in step S406 has been performed. If the processing in any of steps S402, S404, and S406 has been performed, in step S408, the bottom-half processing unit 210 is re-registered in the scheduler, and the process is terminated.

The present invention has been described in detail in the context of specific embodiments. However, obviously, it is possible for those skilled in the art to make modifications or alternatives without departing from the scope of the present invention. That is, the present invention has been disclosed by way of example, and the present invention should not be construed as limited to the embodiments. The scope of the present invention should be determined on the basis of the claims.

The series of processes described in this specification can be executed by hardware, by software, or by a combination of hardware and software. When the series of processes is to be executed by software, a program recording the processing sequences is executed by installing it on a memory of a computer embedded in dedicated hardware or on a general-purpose computer that is capable of executing various processes. For example, the program may be recorded in advance on a recording medium. Besides installing the program into a computer from a recording medium, the program may be received via a network such as a local area network (LAN) or the Internet and may be installed on a recording medium, such as a built-in hard disk.

The processes described in this specification may be performed in a time-series manner according to the description, or may be executed in parallel or individually depending upon the processing performance of an apparatus executing the processes or according to the necessity. The term "system" in this specification is a logical set of a plurality of apparatuses and is not limited to the structure in which these apparatuses are housed in a single housing.

What is claimed is:

1. An information processing apparatus, comprising:
   a plurality of nodes, the nodes comprising memories and processors connected to corresponding system buses;
   an interconnection bus configured to interconnect the nodes;
   a device configured to perform data processing, the device being connected to a first one of the system buses; and
   a memory selecting unit configured to:
      select a first one of the memories, the first memory being associated with the first system bus;
      determine whether the first memory is accessible to the device;
      select a second one of the memories, when the first memory fails to be accessible to the device, wherein the second memory is associated with a second system bus different from the first system bus;
      determine whether cache coherency is maintained between the nodes associated with the first and second system buses;
      invalidate a cache corresponding to the node associated with the second system bus, when cache coherency fails to be maintained; and
      enable the device to access the second memory associated with the second system bus.

2. The information processing apparatus of claim 1, wherein the memory selecting unit, is further configured to terminate the data processing performed by the device, when the first memory fails to be accessible to the device.

3. The information processing apparatus according to of claim 1, wherein the memory selecting unit is further configured to repeat the selection of the first memory, when the first memory fails to be accessible to the device.

4. The information processing apparatus of claim 1, further comprising a processor selecting unit configured to select a first processor connected to the first system bus, the first processor being configured to execute a device driver corresponding to the device.

5. The information processing apparatus of claim 4, wherein the first processor is configured to execute an application using the device.

6. The information processing apparatus of claim 4, wherein:
   the device driver comprises a main processing performing portion configured to perform main data processing and an interrupt processing performing portion configured to perform interrupt processing; and
   the first processor is configured to execute the main processing performing portion, and a second processor that is different from the first processor is configured to execute the interrupt processing performing portion.

7. The information processing apparatus of claim 6, wherein the interrupt processing performing is configured to select the second processor using one or more selecting schemes, the selecting schemes comprising at least one of selecting a processor connected to the first system bus, selecting a processor based on a corresponding processor load, or selecting a processor using the round-robin scheme.

8. The information processing apparatus of claim 6, wherein:
   the device is configured to perform communication processing; and
   the main processing performing portion is executed by the device to perform at least one of data sending completion processing, data reception completion processing or error processing.

9. An information processing method, comprising:
   identifying a plurality of nodes and a device configured to perform data processing, the nodes comprising memories and processors in connection with corresponding system buses, and the device being connected to a first one of the system buses;
   selecting a first one of the memories, the first memory being associated with the first system bus;
   determining whether the first memory is accessible to the device;
   selecting a second one of the memories, when the first memory fails to be accessible to the device, wherein the second memory is associated with a second system bus different from the first system bus;

determining whether cache coherency is maintained between the nodes associated with the first and second system buses;

invalidating a cache associated with the second system bus, when cache coherency fails to be maintained; and enabling the device to access the second memory associated with the second system bus.

10. A non-transitory, computer-readable storage medium storing a program that, when executed by a processor, causes the processor to perform a method for information processing, comprising:

identifying a plurality of nodes and a device configured to perform data processing, the nodes comprising memories and processors in connection with corresponding system buses, and the device being connected to a first one of the system buses;

selecting a first one of the memories, the first memory being associated with the first system bus;

determining whether the first memory is accessible to the device; and selecting a second one of the memories, when the first memory fails to be accessible to the device, wherein the second memory is not associated with a second system bus different from the first system bus;

determining whether cache coherency is maintained between the nodes associated with the first and second system buses;

invalidating a cache associated with the second system bus, when cache coherency fails to be maintained; and enabling the device to access the second memory associated with the second system bus.

* * * * *